April 7, 1925.  J. A. BEDINGFIELD  1,532,571
AUTOMOBILE TIRE RIM
Filed June 1, 1922   2 Sheets-Sheet 1
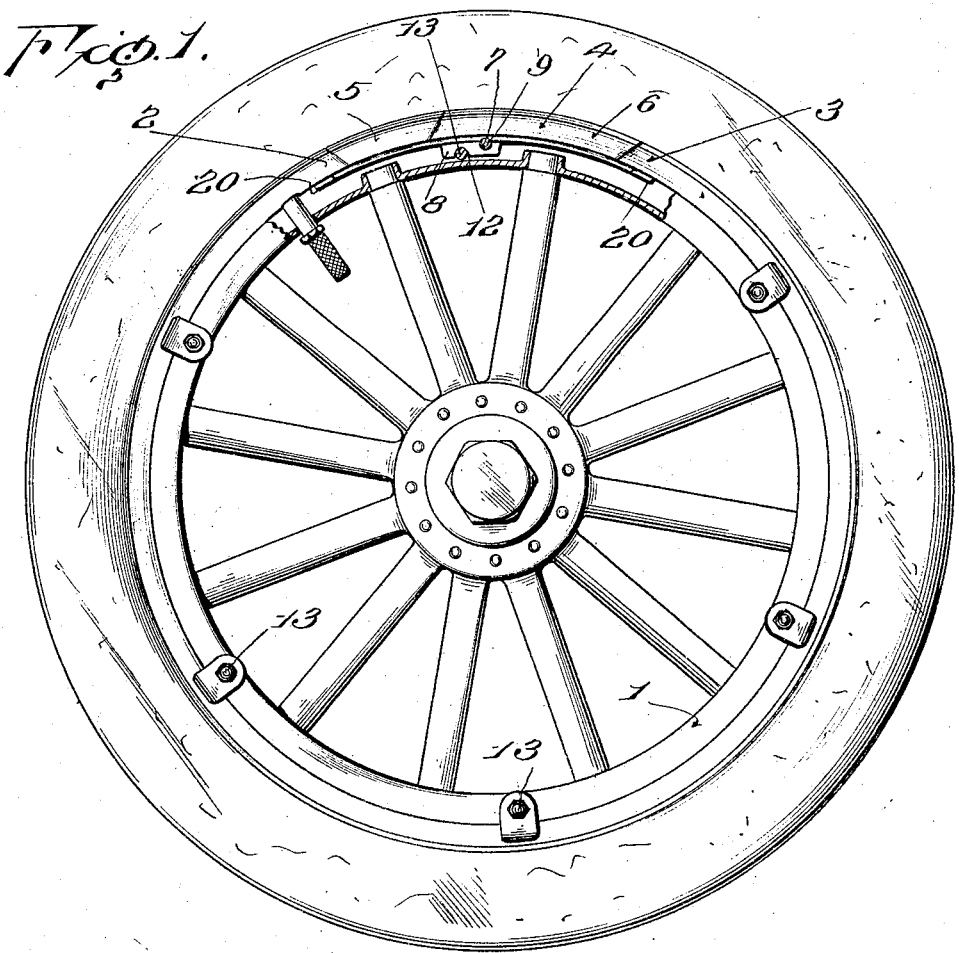
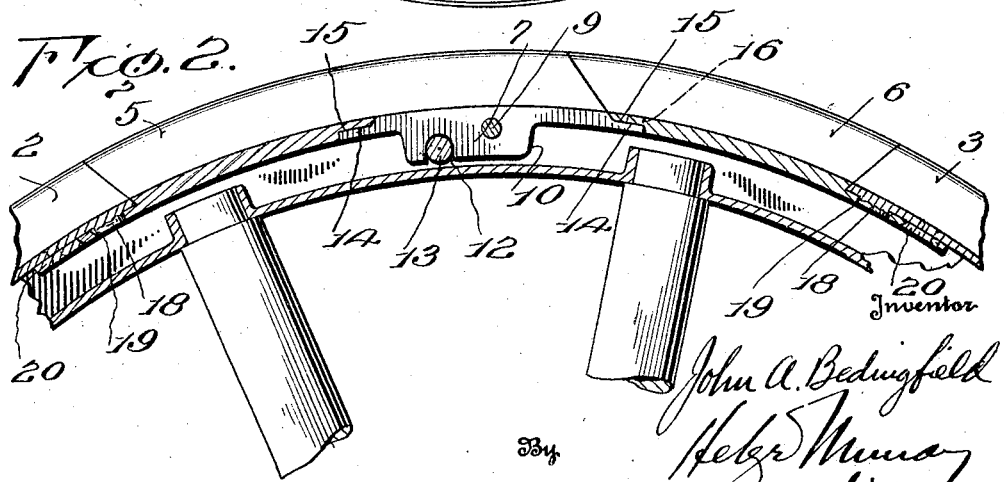

April 7, 1925.
J. A. BEDINGFIELD
AUTOMOBILE TIRE RIM
Filed June 1, 1922
1,532,571
2 Sheets-Sheet 2
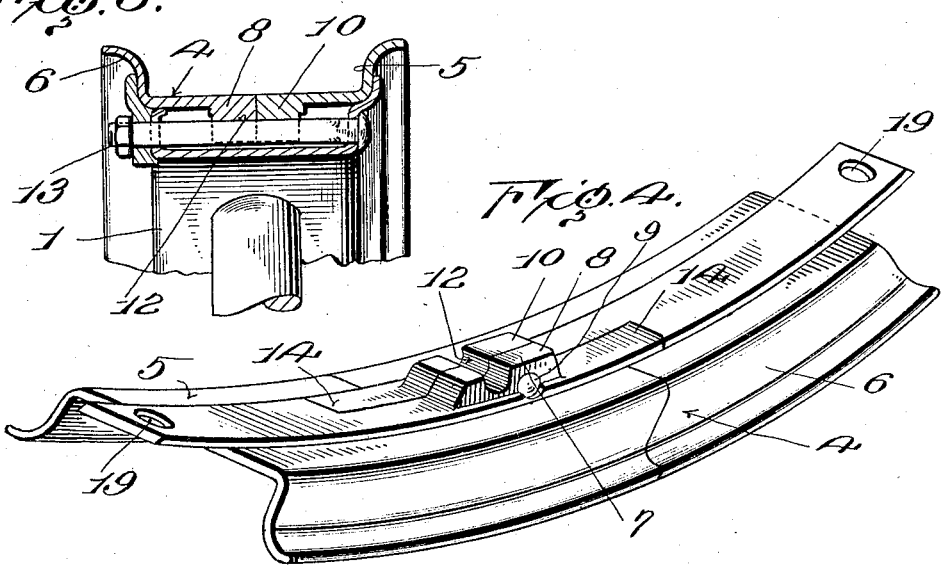
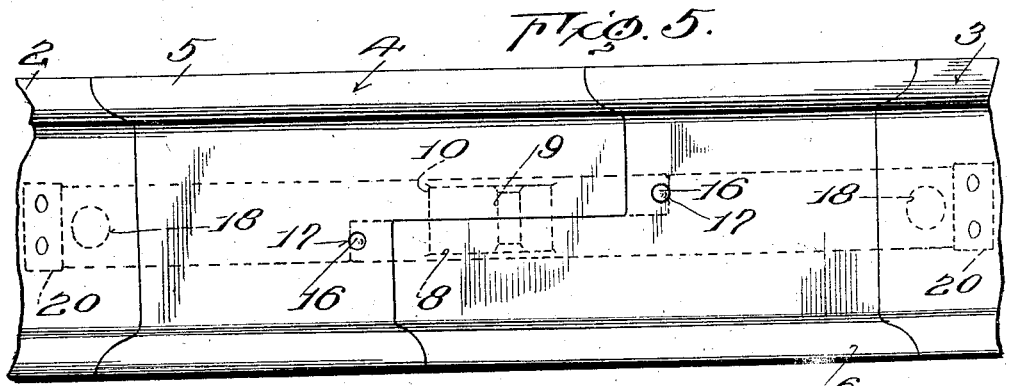
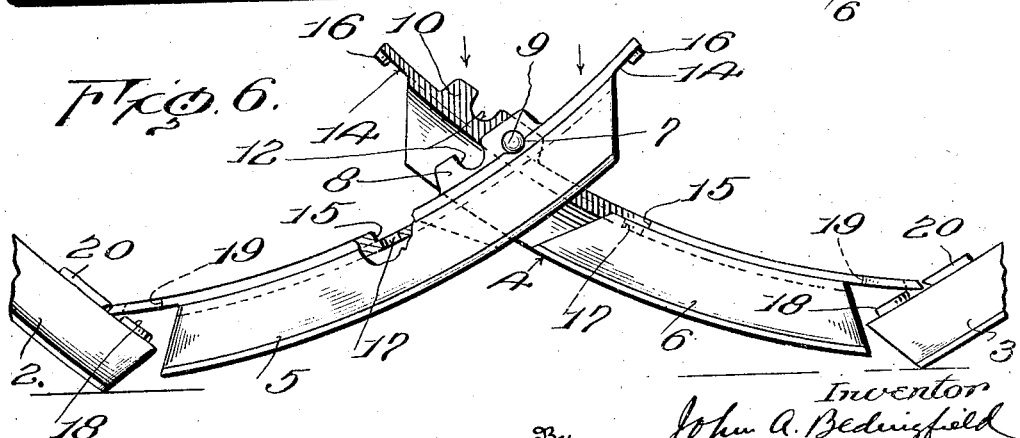

Patented Apr. 7, 1925.

1,532,571

UNITED STATES PATENT OFFICE.

JOHN A. BEDINGFIELD, OF FORT VALLEY, GEORGIA, ASSIGNOR TO INTER-LOCKING TOGGLE RIM COMPANY, OF HOUSTON COUNTY, GEORGIA.

AUTOMOBILE TIRE RIM.

Application filed June 1, 1922. Serial No. 565,116.

*To all whom it may concern:*

Be it known that I, JOHN A. BEDINGFIELD, a citizen of the United States, residing at Fort Valley, in the county of Houston and State of Georgia, have invented certain new and useful Improvements in Automobile Tire Rims, of which the following is a specification.

My invention relates to automobile rims and, more particularly stated, contemplates the production of a rim adapted for use upon hollow metal types of felloes.

An object of the present invention is to provide a rim consisting of a relatively permanent or non-collapsible rim section and a hinged detachable rim section therefor, said detachable rim section being formed with a smooth and uninterrupted hinge joint adapted to effectively support the tire, and having means associated with said joint for engaging a portion of the felloe or wheel rim securing means, said means serving as the driving means for the wheel.

Another object of the invention is to provide in combination a rim section having an open portion or gap therein, a detachable rim section formed of relatively short rim sections hinged together near their inner ends, means for locking the outer ends of the short sections to the first named rim section, means for interlocking the inner ends of said short sections to an adjacent short section, and means arranged approximately at the hinge joint of said short sections and intermediate said interlocking means adapted to act as a driving connection to be suitably engaged with coacting means carried by the felloe of a wheel.

Another object of the invention is to provide a detachable rim section formed of rim sections having an intermediate pivotal connection and means associated with said connection and carried by adjacent rim sections whereby when the detachable rim sections are expanded into place to complete the rim the said associated means of each adjacent rim section is brought into cooperative relation to form a driving device capable of being interconnected with a wheel rim securing bolt or other device provided on the felloe.

A further object of the present invention is to provide in combination a rim formed with an open portion or gap therein, a detachable rim section composed of relatively short rim sections hinged at their inner ends, the extreme inner ends of said rim sections being arranged to abut in longitudinal and transverse staggered relation and having coacting cut away portions adapted to overlap to provide a tight and rigid support for the tire, means located intermediate said overlapping end portions of the short rim sections and adjacent the hinge, said means constituting a driving device adapted to fit over a rim securing portion carried by the felloe of the wheel.

With these and other objects in view as will appear hereinafter, my invention further consists in the construction and arrangment of the parts so as to provide a rim in which the necessary rigidity and strength is maintained, and also permit of a rapid and comparatively easy change of the tire.

In the drawings chosen to illustrate an embodiment of my invention the scope whereof is pointed out in the claims:

Figure 1 is a view in side elevation of my improved rim applied to a hollow type of automobile rim with parts in section and showing the driving means provided on the hinged detachable section and engaging a rim securing bolt.

Figure 2 is a fragmentary enlarged sectional view through the detachable rim section and hinge joint showing said rim section in expanded position and engaging a transversely extending rim fastening device.

Figure 3 is a transverse sectional view through the felloe and portion of the wheel showing my improved rim connected thereto with the hinge joint engaging a rim securing bolt.

Figure 4 is a detail perspective view of the detachable rim section with the adjacent cooperating projections of the hinge joint in registered or alined position and for engaging a coacting portion on the wheel.

Figure 5 is a plan view of the outer face of the detachable rim section showing the staggered relation of the inner ends of the hinged rim sections, the respective inner and outer ends of each of said hinged rim sections being shown interlocked.

Figure 6 is a view showing the detachable rim section in retracted or broken position with relation to the ends of the non-collapsible rim section.

The present invention has been designed with a view to more perfectly uniting the hinged sections of the detachable rim section and to utilize portions of said hinge as the driving connection to be fitted over a rim securing bolt.

Referring to the drawings in which corresponding reference characters designate similar parts in the several views, the relatively permanent or non-collapsible rim section 1 is formed with an open segmental portion or gap between the ends 2 and 3 thereof for the reception of the collapsible and detachable rim section 4.

The detachable rim section is formed of sections 5 and 6 held together intermediate their ends by means of the pivotal or hinge connection 7. The hinge connection is located centrally of the base portion of the rim sections 5 and 6 and includes adjacent cooperating projections 8 carried by the respective sections 5 and 6, and each formed with a registering opening for the pivot pin 9. Other adjacent cooperating projections 10 are provided on the respective sections 5 and 6, said projections being arranged in spaced relation to the projection 9 and adapted to register and form an opening or recess indicated at 12 arranged to receive one of the rim fastening bolts 13. The pivot pin 9 is set back from the extreme inner ends of the sections 5 and 6, and the respective cooperating projections 8 and 10 are located intermediate said inner ends. The vertical walls or faces of adjacent projections are alined longitudinally or circumferentially of the rim, said faces being closely abutted to firmly brace the hinge joint.

The extreme inner ends of the sections 5 and 6 are cut away at 14, each of said cut away portions coacting with a mating cutout portion 15 provided in the adjacent rim section upon the opposite side of the hinge joint. When the detachable rim section is expanded the cut away portions overlap and form a strong support for the tire of a normal thickness corresponding to the thickness of the rim. This is desirable in metal felloe construction so as to avoid the inwardly projecting spoke engaging flanges or bosses.

A locking pin 16 extends from each inner end of the sections 5 and 6, each of said locking pins being adapted to enter an opening 17 provided in the adjacent rim section as shown. When engaged the locking of said end portions to adjacent rim sections upon each side of the hinge joint provides a strong, durable and rigid connection for effectively supporting the tire and preventing lateral or other movement of the rim section with respect to each other when the rim is in service. The pin 16 and opening are located radially with relation to the pivotal connection 7, whereby the pins 18 snugly fit within the opening 19 and positively lock the rim sections against movement and prevent any tendency of said sections to rattle. By this construction the strain upon the pivot pin is reduced to a minimum and the size of the pivotal connection can be made correspondingly small.

The inner ends of the sections 5 and 6 are cut longitudinally of the base of the rim and transversely thereof at points remote from the hinge joint as shown, the transversely abutting edges of said inner ends extending into the side flanges of the rim and forming the angular joints, as shown. The sides or beads of the tire are supported upon the staggered joint formed in the base of the rim adjacent the side flanges, and the strains of the joint are therefore distributed at points obliquely located as distinguished from points in the tire immediately opposite.

The open ends 2 and 3 of the non-collapsible rim sections project beyond and overlap the outer ends of the rim sections 5 and 6 and are provided with locking devices in the form of pins 18. Openings 19 are provided in the outer ends of the respective rim sections 5 and 6 and are designed to receive the locking pins 18 when the detachable rim section is expanded in place as best shown in Figure 2. The pin and opening form the locking means for the connected ends of the rim section. The extreme outer ends of the sections 5 and 6 are each arranged to abut against the lugs 20 provided on the ends 2 and 3 of the rim section 1.

I claim:—

1. A tire supporting rim comprising a section having an open portion or gap therein, a detachable rim section composed of relatively short sections having their free ends extending into and secured within the said open portion for completing the rim, and a hinge connection for the inner ends of said relatively short sections, said detachable rim section having portions arranged at the inner ends of the short section and adjacent said hinge connection for forming circumferentially spaced abutments adapted to provide a driving connection between said rim and the wheel to which it is applied.

2. A tire supporting rim comprising a section having an open portion or gap therein, a detachable rim section composed of relatively short sections having their free ends extending into and secured within the said open portion for completing the rim, means for hinging the inner ends of said relatively short sections and means including a recess into which is adapted to fit at least one of the rim fastening devices, said recess being formed at the inner ends of said short sections when the detachable rim section is expanded within the open portion for completing the rim.

3. A tire supporting rim comprising a section having an open portion or gap therein, a detachable rim section composed of relatively short sections having their free ends extending into and secured within the said open portion for completing the rim, a joint for hinging the inner ends of said relatively short sections together, and means including co-acting members carried by the respective short sections and arranged adjacent said joint for engaging a rim bolt fastening device.

4. A tire supporting rim comprising a section having an open portion or a gap therein, a detachable rim section composed of relatively short sections having their free ends extending into and secured within the said open portion for completing the rim, a hinge joint for said relatively short section, and means involving recesses provided in the respective members of the hinge joint, said recesses being adapted to register when the detachable rim is expanded in place to form a transverse recess or groove adapted to fit over one of the rim fastening devices.

5. A tire supporting rim including a section having an open portion or gap therein, a detachable rim section composed of relatively short sections having their free ends extending into and secured within said open portion for completing the rim, a hinge joint having adjacent projections on the respective members of said hinge joint, each of said projections being provided with means adapted to register with cooperating means on an adjacent projection when the detachable rim section is expanded in place for engaging a driving means on the felloe of a wheel.

6. A tire supporting rim including a section having an open portion or gap therein, a detachable rim section composed of relatively short sections having their free ends extending into and secured within said open portion for completing the rim, means for hinging said relatively short sections together, and co-acting means provided on the respective short sections arranged to form a single means when the detachable rim section is expanded in position for completing the rim, said single means being adapted to be engaged with a rim bolt carried by the felloe of a wheel to provide a driving connection therefor.

7. A tire supporting rim involving a section having an open portion or gap therein, a detachable rim section composed of relatively short sections having their free ends extending into and secured within said open portion for completing the rim, a hinge joint for said relatively short sections, said hinge joint being formed with spaced projections adapted to engage a bolt of the rim securing means carried by the felloe of a wheel.

8. A tire supporting rim involving a section having an open portion or gap therein, a detachable rim section composed of relatively short sections having their free ends extending into and secured within said open portion for completing the rim, and a hinge joint for said relatively short sections, said hinge joint being formed with cooperating projections each of said projections being formed with a transverse groove adapted to register with an adjacent groove in a cooperating projection when the detachable rim section is expanded into position, said registering adjacent grooves forming a single transverse groove or recess adapted to fit over a portion of the wheel rim securing means.

9. A tire supporting rim involving a section having an open portion or gap therein, a detachable rim section composed of relatively short sections having their free ends extending into and secured within said open portion for completing the rim, and a joint for hinging said relatively short sections together, said joint including a plurality of projections carried by the respective inner ends of said short sections, a pivot pin passing through an adjacent pair of said projections, and another pair of said projections arranged relatively close to said first named adjacent pair of projections for forming an opening adapted to receive a rim fastening device.

10. A tire supporting rim comprising a section having an open portion or gap therein, a detachable rim section composed of relatively short sections having their free ends extending into and secured within the aforesaid open portion for completing the rim, a hinge joint for connecting said short rim sections together with their inner ends abutting longitudinally and transversely of the rim, and means including projections carried by the inner ends of said short sections arranged adjacent said longitudinal portion of the joint and intermediate said transverse portions of the joint, said projections coacting and arranged for engagement with a portion of a wheel rim securing means when the detachable rim section is expanded into the open portion or gap to complete the rim.

11. A tire supporting rim comprising a section having an open section or gap therein, a detachable rim section composed of relatively short sections having their free ends extending into said gap for completing the rim, co-acting devices for locking the first named rim section and said detachable rim section together, a hinge joint for connecting the inner ends of said short sections together, said hinge joint being located back of the abutting extreme inner ends of said short sections, means for interlocking the inner ends of said short sections together, and overlapping means on each of said short sections arranged between said interlocked inner ends for engaging a rim fastening bolt provided on the felloe of a wheel.

12. A tire supporting rim including a section having an open portion or gap therein, a detachable rim section composed of relatively short sections having their free ends extending into said gap, means for locking said free ends to the first named rim section, a hinge joint connecting the inner ends of said short sections in smooth abutted relation, means for interlocking the respective abutting inner ends of said short sections, and means including spaced portions arranged adjacent the hinge joint and intermediate said interlocking inner ends adapted to coact with means carried by a felloe of a wheel for forming a driving connection between said rim and wheel.

In testimony whereof I affix my signature.

JOHN A. BEDINGFIELD